July 10, 1945.　　　L. C. LUDBROOK　　　2,380,251
ELECTROMAGNETIC GAUGE
Filed July 11, 1944

Inventor:
Leslie C. Ludbrook,
by Harry E. Dunham
His Attorney.

Patented July 10, 1945

2,380,251

UNITED STATES PATENT OFFICE 2,380,251

ELECTROMAGNETIC GAUGE

Leslie C. Ludbrook, Cawston, near Rugby, England, assignor to General Electric Company, a corporation of New York Application July 11, 1944, Serial No. 544,450
In Great Britain July 13, 1943

3 Claims. (Cl. 177—351)

This invention relates to electro-magnetic gauges wherein a change in the relation of an armature to a magnetic core energized with an alternating current flux is caused to vary the current flow in a winding or windings associated with the core, the current being rectified and fed to a direct current ammeter. The change in the relation between the armature and core is caused by a difference in the dimension to be gauged between a standard test piece and a part to be tested, and the indication given by the ammeter is calibrated to indicate the departure from standard is the dimension of the part to be tested.

Usually such instruments are provided with a centre-zero ammeter and are so adjusted that a departure from standard of the dimension to be gauged on either sign is indicated by positive and negative deflections of the ammeter index.

Owing to the particular shape of the characteristic curve connecting output voltage with armature displacement, the ammeter is usually adjusted to read zero with a definite current flow, and the position of the centre zero and scale calibration are both affected by a change in the voltage of the alternating current supplied to the windings which produce the flux in the core. Steps are taken to maintain the supply voltage as nearly constant as is possible, but even so difficulties accompanying zero shift are still experienced.

It is the object of the invention to provide an improved form of electro-magnetic gauge which possesses greater sensitivity and freedom from zero shift.

According to the invention the output from the alternating current winding associated with the core, is applied to the ammeter through a phase sensitive demodulator bridge circuit of known character which is biased by alternating current in phase with the supply. By this arrangement the centre zero ammeter is operated with zero current at the position of the armature corresponding to the standard dimension, and the characteristic curve, being linear through the origin, is such that maximum sensitivity and freedom from zero shift due to line voltage variation is obtained.

Figure 1:
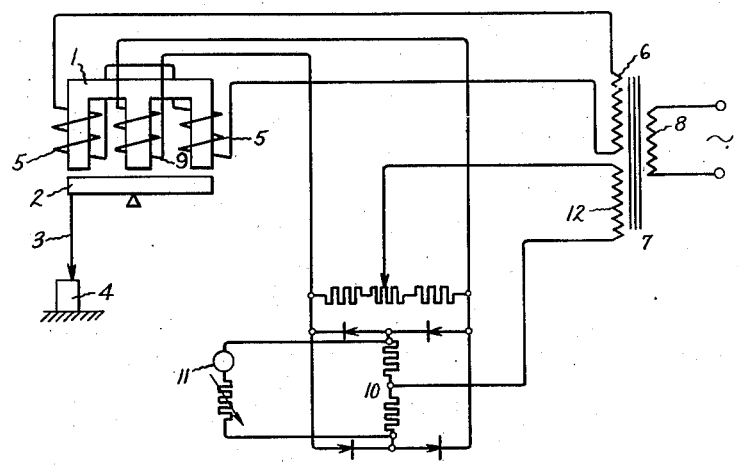
Figure 2:
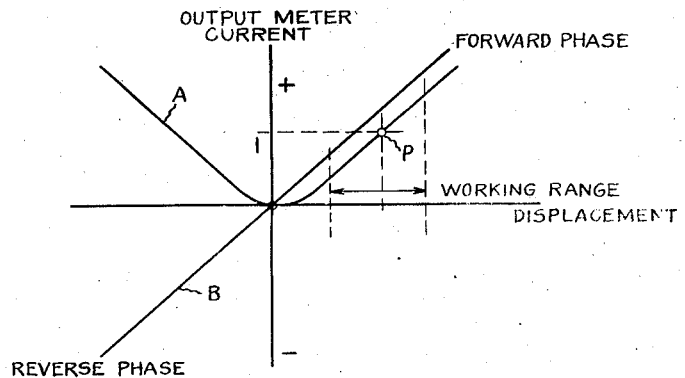

The invention is illustrated by the accompanying diagrammatic drawing in which Fig. 1 shows the circuit arrangement employed, and Fig. 2 is a curve differentiating the present invention from the hitherto known arrangements.

Referring to Fig. 1 I have illustrated the invention as applied to a known form of electromagnetic gauge head comprising an E-shaped core 1 and a pivoted armature 2 cooperating therewith, the armature being provided with a feeler 3 adapted to be brought into engagement with a standard part or part to be tested 4. The outer limbs of the core 1 are provided with windings 5 energized in series from the secondary winding 6 of a transformer 7, the primary winding 8 of which is energized from a suitable alternating current source. The central limb of the core 1 carries a winding 9.

The windings 5 are so connected that with equal air gaps between the outer limbs of the core at the armature 2, no alternating current voltage appears in winding 9, but with unequal air gaps an alternating current voltage having a magnitude depending on the discrepancy in the air gaps and a phase which is either forward or reversed according to which air gap is the greater. The output from the winding 9 can thus be used to indicate a difference in the dimension to be gauged of a part 4 to be tested when substituted for a standard gauge part.

Normally the output from winding 9 is supplied to a centre-zero micro-ammeter after rectification. According to the present invention, however, the output from winding 9 is supplied to a phase sensitive demodulator bridge circuit 10 of known character which produces in the ammeter 11 a direct current having a magnitude proportional to the alternating current voltage applied to the terminals of the bridge from winding 9 and a polarity which reverses with reversal of phase in such alternating current voltage. The bridge 10 is biased by an alternating current voltage of the same phase as that supplied to windings 5 and preferably obtained from a secondary winding 12 of transformer 7.

The difference in functioning of the arrangement forming the subject matter of the present invention and of prior art arrangements is illustrated by the characteristic curves A and B shown in Fig. 2, in which the output from winding 9 is plotted as ordinates against the displacement of the armature as abscissae. Curve A is the characteristic curve of prior art arrangements, and it will be noted that near the zero point the curve has a relatively flat base resulting from contact resistance of the rectifiers employed for rectifying the alternating current output from winding 9. Since this flat base results in reduced sensitivity, the normal position for operating the centre-zero ammeter is at a point, such as P, on the linear portion of the curve, the ammeter being adjusted to read zero for the current value given at this point and operating over that section of the curve designated "working range." A change in voltage to the alternating current supply in such arrangements causes the change in the slope of the curve A with a result that the point P is shifted and the zero reading of the ammeter changed.

This disadvantage is removed by the present arrangement, the characteristic curve B of which is indicated. Since the curve is a straight line passing through the origin and the ammeter is adjusted to read zero, at zero current a change in slope due to a change in alternating current voltage will only affect calibration of the ammeter to a slight extent without affecting its zero reading and the useful operating range is very materially increased. Rectifier contact resistance is compensated in the bridge circuit by the alternating current bias.

It will be understood that the type of gauge head shown in Fig. 1 is only one of a number of known types to which the invention may be applied and has only been given for the sake of example.

It is to be observed that the four rectifiers are connected in a closed series circuit as the four arms of a bridge 10 with the rectifiers connected to pass current in the same direction about such series bridge circuit, the output of the electromagnetic gauge coil 9 or other measuring apparatus is connected across one diagonal of such rectifier bridge circuit and the zero center direct current measuring instrument 11 is connected across the other diagonal of the rectifier bridge circuit, and an alternating current voltage from transformer winding 12 of the same frequency as that which energizes the electro-magnetic gauge is connected to the bridge to excite the rectifiers for the purpose of compensating their contact resistance at low current values. The impedances connected across the bridge diagonals and employed for making the rectifier excitation circuit connections from transformer winding 12 do not necessarily need to be resistances, but the connections used should be such that the rectifier excitation current from 12 does not tend to flow into the gauge output circuit through coil 9 or into the direct current instrument circuit 11. That is, the rectifier excitation circuit is neutral with respect to the measurement input and output circuits of the bridge.

What I claim as new and desire to secure by Letters Patent of the United States, is:

1. A phase sensitive bridge circuit comprising four rectifiers connected in a series closed circuit as the four arms of a bridge with all of the rectifiers connected for the same direction of current flow about said bridge circuit, a resistance connected across one diagonal of such bridge, a second resistance connected across the other diagonal of such bridge, excitation input terminals at the midpoints of said resistances, measurement input terminals connected across one of the bridge diagonals, a common source of alternating current supply for said excitation input and measurement input terminals, means responsive to a measurement for varying the voltage applied to the measurement input terminals and reversing its phase relation with respect to said source of supply, and a zero center direct current measuring instrument connected across the other bridge diagonal.

2. A phase sensitive alternating current measuring circuit comprising four rectifiers connected in closed series circuit relation as the four arms of a bridge with all of the rectifiers connected to pass current in the same direction about such series circuit, impedances connected across both diagonals of said bridge circuit, alternating current input terminals at the extremities of one of said impedances, a zero center direct current measuring instrument connected across the other of said impedances, a second pair of alternating current input terminals at the midpoints of said impedances, and means for supplying said two sets of alternating current input terminals with alternating current voltages of the same frequency, one of said voltages being a substantially constant excitation voltage and the other being a measurement voltage which varies in magnitude and reverses in phase relative to the excitation voltage.

3. Electromagnet gauge measuring apparatus comprising four rectifiers connected in a closed series circuit as the four arms of a bridge with the rectifiers connected to pass current in the same direction about said series circuit, connections for exciting the rectifiers with alternating current so as to compensate for the contact resistance of the rectifiers at low current values, an electromagnetic gauge having an alternating current output voltage which varies in magnitude and reverses in phase in response to different gauge measurements and connections for applying said output voltage across one diagonal of said rectifier bridge circuit, a common source of alternating current supply for energizing said gauge and exciting said rectifiers and a zero center direct current measuring instrument connected across the other diagonal of said rectifier bridge circuit and calibrated with said apparatus in terms of the gauge measurements.

LESLIE C. LUDBROOK.